United States Patent [19]

Hicks

[11] Patent Number: 5,023,655
[45] Date of Patent: Jun. 11, 1991

[54] APPARATUS FOR PRINTING INFORMATION ON A SUBSTANTIALLY CONTINUOUS ROLL OF PHOTOGRAPHIC PAPER

[76] Inventor: Ray Hicks, 2605 Corunna Rd., Flint, Mich. 48503-3362

[21] Appl. No.: 453,582

[22] Filed: Dec. 20, 1989

[51] Int. Cl.$^5$ .................. G03B 27/32; G03B 27/52
[52] U.S. Cl. ................................. 355/39; 355/40; 355/29
[58] Field of Search ..................... 355/39, 40, 29

[56] References Cited

U.S. PATENT DOCUMENTS 2,843,004  7/1958  Pajes ........................... 355/39
4,088,404  5/1978  Zahn et al. .................. 355/40
4,629,312  12/1986  Pearce et al. ............... 355/29
4,823,163  4/1989  Rollet et al. ................ 355/39

Primary Examiner—Monroe H. Hayes
Attorney, Agent, or Firm—Krass & Young

[57] ABSTRACT

The invention consists of improved apparatus for printing information on a substantially continuous roll of photographic paper in package and proof printers. A bracket suspends the marking device over a guide roller to be utilized as the platen for the marking process. Further, by attaching the bracket to the exposure platen, the leading, preparing, maintaining and servicing of the devices are able to be suspended in this manner.

17 Claims, 3 Drawing Sheets

APPARATUS FOR PRINTING INFORMATION ON A SUBSTANTIALLY CONTINUOUS ROLL OF PHOTOGRAPHIC PAPER

FIELD OF THE INVENTION

The present invention relates to means for mounting electronic printing apparatus in devices for exposing photographic prints onto a substantially continuous roll of photographic paper.

BACKGROUND OF THE INVENTION

Many businesses and photographers require reproduction of large quantities of photographic prints from film negatives. To quickly and efficiently produce these photographic prints, companies typically utilize what are commonly called, "proof" or "package" printers. These printers possess the capability of exposing multiple prints at a single time on the emulsion side of a continuous roll of photographic paper. By controlling the movement of the photographic paper and selecting the appropriate combination of lenses, the location, size and number of prints from each negative are controlled as the paper is exposed. These printers provide speed and economy, and eliminate wasted photographic paper.

The multiple exposure of large numbers of photographic prints on a substantially continuous roll of paper, which are later cut into individual prints or individual sheets (such as 8'×11"), can create identification problems. The large number of photographic prints create difficulties in correlation between photographer, client and print. Thus, it becomes highly desirable to print information on the reverse side of the continuous roll of paper in separate locations corresponding to the back of the individual prints or sheets exposed thereon. The information, typically in code form, can relate the individual customer, photographer, print job, cost, or subject information to a specific print or sheet.

Typically, a thermal marker prints alpha-numeric characters on resin coated photographic paper utilizing heat wax transfer methodologies. Alternatively, standard dot matrix impact heads are utilized, although they do not yield as dark an image, requiring considerable adjustment to maintain reasonable image quality. The marking device is suspended on a bracket attached to the housing wall of the package or proof printer. This bracket extends over the photographic paper and positions the marking means for contact with the reverse side of the continuous roll of photographic paper. A second, separately mounted bracket mounts within the housing and contacts the emulsion side of the photographic paper. This positioning allows the second bracket to serve as a platen for the marking device.

Several problems exist with the current methodology. By suspending the two brackets on either side of the paper additional contact surfaces are created for the sensitive and fragile roll of photographic paper. The additional surface contact added to the existing machine guide system increases the likelihood of paper damage. Further, current printer mounting methods create another obstacle to threading of the photographic paper, which typically occurs in the dark, through the guides and rollers controlling the movement of the photographic paper. The rearward mounting location of the markers makes removal and access for maintenance of its components difficult. The installation requires considerable modification of the machine, and has heretofore only allowed for a single marker to be used within one printer housing.

The present invention provides a means for printing information on a substantially continuous roll of photographic paper which overcomes the problems of the current technology.

SUMMARY OF THE INVENTION

The present invention provides an improved apparatus for printing information on the reverse side of a substantially continuous roll of photographic paper in devices for systematically exposing photographic images on the front side of the same roll of photographic paper. The information placed on the reverse side of the paper corresponds to the separate photographic images on the emulsion side or front and may relate these photographic images to specific printers, photographers, customers, orders, negatives, or the like.

Devices for systematically exposing photographic images on the front side of a substantially continuous roll of photographic paper utilize a film exposure area wherein at least one photographic image is exposed. An exposure platen retains the photographic paper in a planar configuration for proper printing during the exposure process, typically by a vacuum applied to one side of the paper causing the paper to adhere to the exposure platen.

The photographic paper moves through the film exposure area being guided by a series of rollers. Photographic paper from a large initial roll is driven by at least one metering drive roller to control the amount of travel of the paper, thereby controlling the positioning of the paper as it relates to the film exposure area. At least one take-up roller serves to guide the exposed photographic paper for appropriate storage and processing.

The invention serves to attach at least one marking device to the exposure platen, suspending a print head above the metering drive roller. The metering drive roller includes a groove accommodating the contours of the print head for each marking device utilized. In this arrangement, the photographic paper passes between the metering drive roller and the print head. The print head is positioned to print information on the reverse side of the photographic paper using the metering drive roller as a platen for the marking processes. Further, by coordinating the marking process with the exposure process utilizing the known distance between the metering drive roller and the film exposure area, the printed information physically corresponds to the appropriate exposed images.

A bracket, attached at one end to said exposure platen and attached at the other end to the marking device, suspends the marking device proximate the metering drive roller. In this manner, multiple marking devices can be suspended from one or more brackets allowing for quadrant (or other Cartesian grid arrangements) printing, without major changes to the overall machine.

The present invention eliminates the need for additional bearing surfaces, especially corresponding to the emulsion side of the photographic paper, which could damage the paper. Further, the present invention is easily removable, and does not require significant modification to the machine. Finally, it eliminates obstacles to loading the paper when removed, and minimally obstructs loading when attached.

BRIEF DESCRIPTION OF THE DRAWINGS

These and other features and aspects of the present invention will become clear from the following detailed description of the invention, in which.

DESCRIPTION OF THE PREFERRED EMBODIMENT

Figure 1:
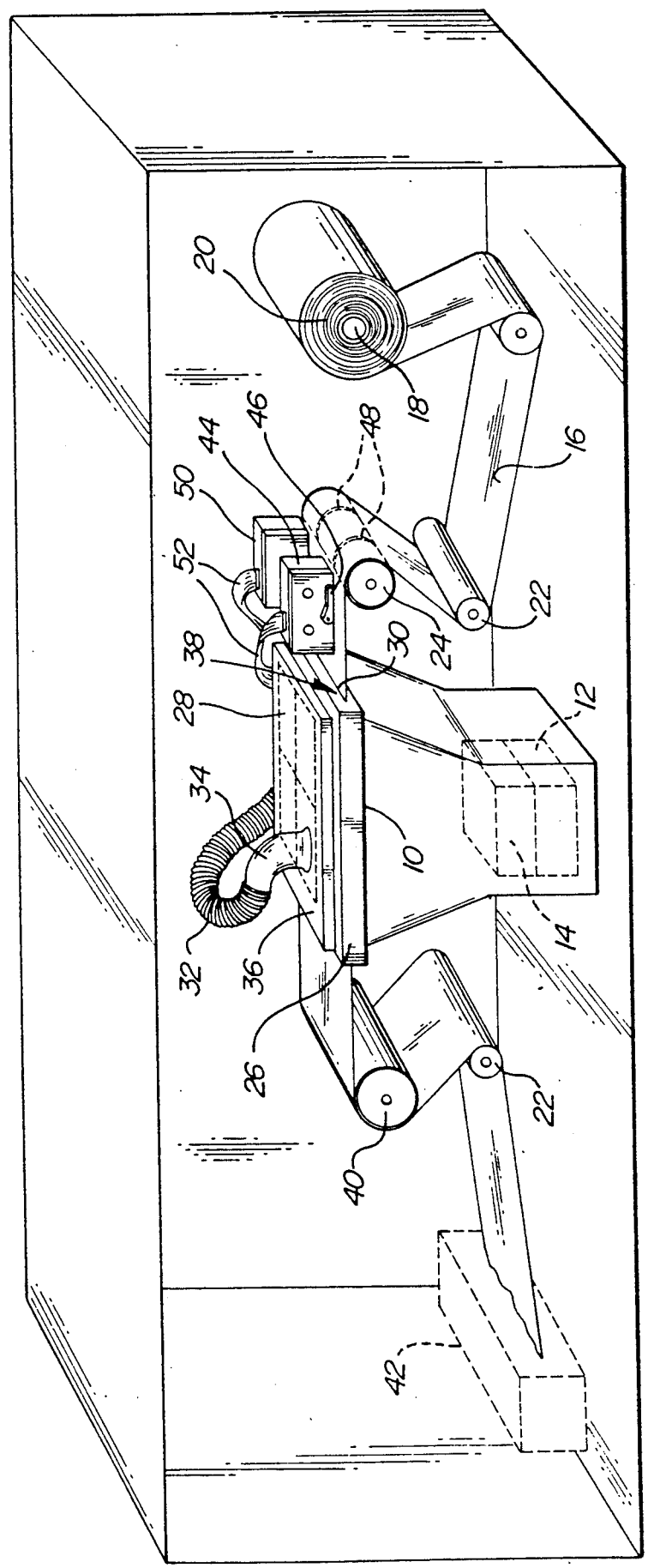
FIG. 1 is a perspective view of the invention in operating position in the photographic printing machine.

With reference to FIG. 1, the photographic printing device includes an exposure area 10 within which is disposed conventional negative exposing equipment 12 and conventional lens arrays 14 for placement of photographic images on photographic paper 16. An image of the negative projects through a lens or lens array 14 configured to multiply the projected image by a preselected number, such as four, and then exposes the photographic paper 16. For example, a seven-inch draw of photographic paper 16 may be taken into the exposure area 10. The image may pass through a lens array 14 configured to multiply the image four times which will produce four identical photographic prints in a Cartesian quadrant pattern. The prints will be three and one-half by five inches of the typical ten inch traverse width of photographic paper 16.

For efficient production of photographs, the photographic paper 16 takes the form of a substantially continuous sheet controlled by a guide system, including paper rollers, platens, and pins. An initial photographic paper storage roller 18 holds the rolled 20 photographic paper 16 in a pre-exposure stage. The photographic paper passes over at least one tensioning roller 22, thereafter engaging the metering drive roller 24. Metering drive roller 24 provides the primary drive force to paper 16 movement. The metering drive roller 24 controllably propels the photographic paper 16 through the exposure area 10 by frictionally engaging the photographic paper 16. The rotation of metering drive roller 24 is further regulated to monitor the corresponding amount of travel of the photographic paper 16. An exposure platen 26, positioned proximate said exposure area 10, provides an area 28 for exposure of a photographic image on the photographic paper 16. An inlet opening 30 at one side of the exposure platen 26 allows the photographic paper 16 to enter the enclosed exposure area 10 and be positioned in area 28. The photographic paper 16 remains planarly disposed in area 28 due to a vacuum applied through hose 32 and connection 34 which retains the photographic paper 16 against the planar top section 36 of exposure platen 26. Guide pins 38 further align and protect the edges of the photographic paper 16 for proper placement in the exposure area 10 as it enters opening 30.

After being exposed, the photographic paper 16 exits the exposure area 10 for cutting, trimming and other processing. Take-up roller 40 provides a secondary driving force behind photographic paper 16 movement. One or more tensioning rollers 22 are again utilized to transport the paper to conventional afterexposure storage and processing operations 42.

The preferred embodiment operates to position a thermal marking device 44, preferably of the heated wax transfer type, proximate the metering drive roller 24, which places the photographic paper 16 between the print head 46 and the metering drive roller 24. The marking device 44 is positioned proximate the reverse (or non-emulsion) side of said photographic paper 16, allowing the marking device 44 to print alpha-numeric information on the back side of photographs exposed on the photographic paper 16.

The thermal marking device 44 utilizing a ribbon having wax deposited on one side thereof. The print head 46, in contact with the ribbon, heats the wax causing it to be transferred onto the photographic paper 16. By correlating the positioning of the information with the distance between the metering drive roller 24 and the area 28, the metering drive roller 24 can be controlled to place the appropriately marked section of photographic paper in area 28 for the corresponding exposure or exposures.

The preferred embodiment marks the paper 16 prior to exposure to prevent damage to exposed photographic prints, which allows the metering drive roller 24 to operate as the platen for the marking device 44. For either a thermal marking device or impact printing marking device, the photographic paper 16 needs to be supported against the print head 46. The metering drive roller 24, acting as a platen, ensures uniform and consistent contact between the print head 46 and paper 16. If necessary, the metering drive roller 24 can be modified to incorporate a circumferential groove 48 which inversely corresponds to the print head 46 of the marking device 44. This small shallow groove does not impair the friction contact of the metering drive roller 24 with the paper 16, being of minimal overall surface area compared to that of the metering drive roller 24. The marking device 44 prints on paper 16 as the metering drive roller 24 operates to drive paper 16 into exposure area 10.

By similarly positioning, one or more additional marking devices 50, and corresponding additional circumferential grooves 51, the instant invention allows for placement of information in multiple specific locations on the photographic paper 16. As depicted, a pair of marking devices 44 and 50 allow for Quadrant printing of information in area 28 (as shown in dotted line). Conventional lens arrays 14 allow for the exposure of multiple images concurrently. Each of the images (or sets of images) multiplied by the lens array 4 can then be marked by one of the marking devices 44 and 50. By coordinating multiple marking devices (such as 44 and 50) through conventional electronic connections 52 and controls, many different Cartesian grid arrangements can be created for marking the reverse side of the photographic paper 16.

Figure 2:
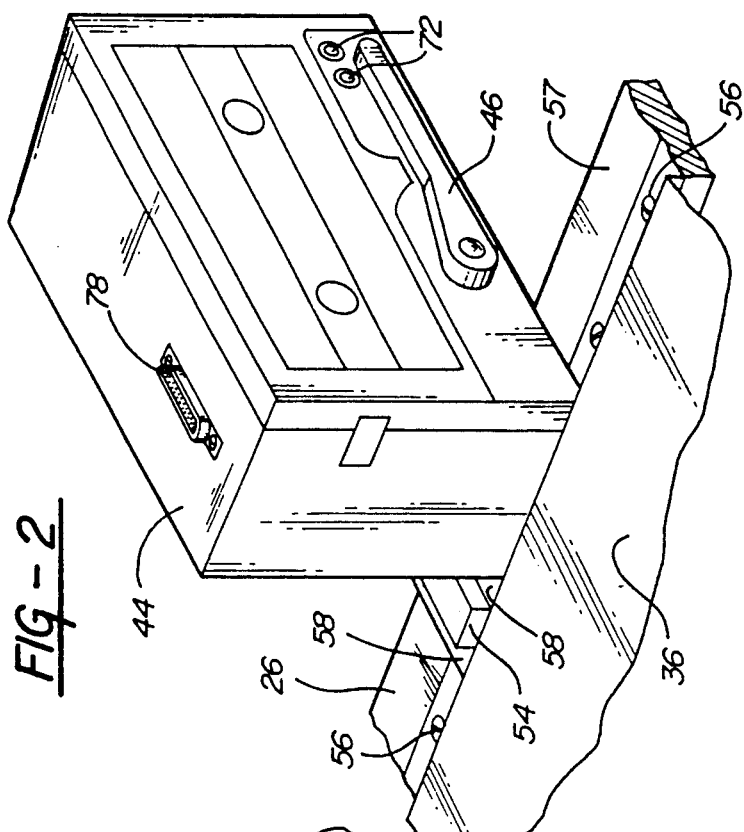
FIG. 2 is a perspective view of the invention attached to the exposure platen.
Figure 3:
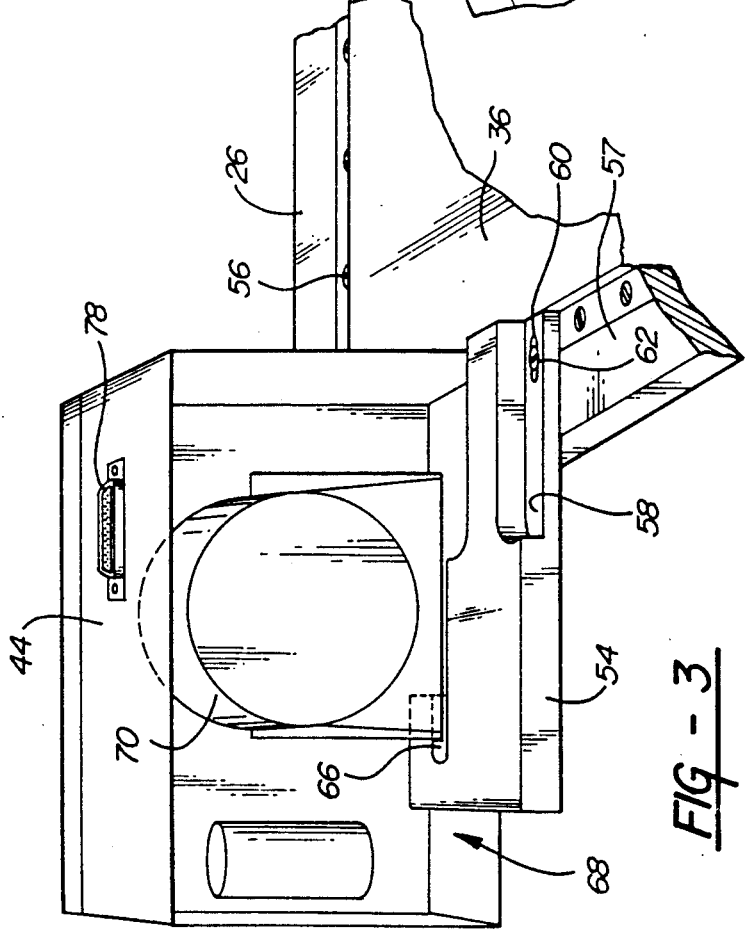
FIG. 3 is a perspective view of the opposite side (from FIG. 2) of the invention attached to the exposure platen.
Figure 4:
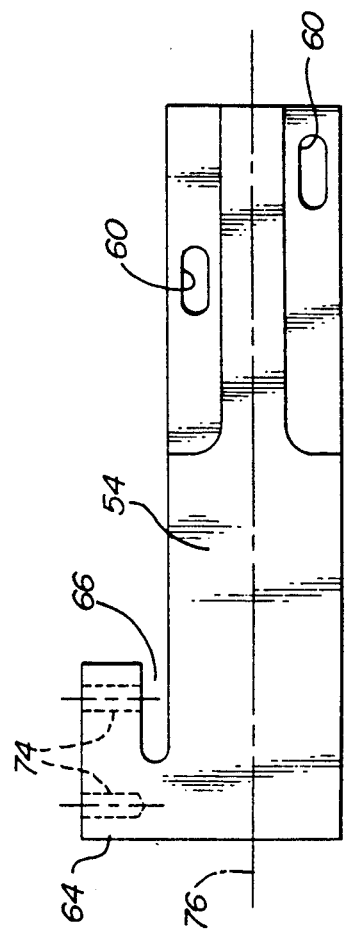
FIG. 4 is an overhead view of the bracket.

With reference to FIGS. 2 through 4, the current invention utilizes a bracket 54 to connect the marking device 44 to the exposure platen 26. The exposure platen 26 comprises a planar top section 36 attached by screw means 56, providing a lip area 57. Bracket 54 can attach to the exposure platen 26 at lip area 57 without interference or extensive modification to the existing structures. To facilitate this attachment, detent areas 58 in bracket 54 have openings 60 allowing for the use of conventional screw means 62 to attach the bracket 54.

The bracket 54, typically made of aluminum for light weight and strength, further includes an attachment site 64 for securely suspending marking devices 44. The attachment site 64 includes recess 66, allowing the bracket can enter the rear opening 68 of the marking device 44 without interfering with the existing internal components 70 thereof. Attachment bolts or screws 72 engage threaded bracket openings 74 thereby securing the marking device 44.

Additional marking devices 50 (FIG. 1) can be attached in one of several manners. The previously described plurality of marking devices 44 and 50 can be attached by modifying the bracket 54 to allow for multiple marking devices 44 to be mounted thereon. For example, by replicating the attachment site 64 as a mirror image about center line 76, the bracket 54 would have a pair of attachment sites 64 for mounting a pair of marking devices 44 and 50. Alternatively a plurality of brackets 54 can be utilized.

By utilizing easily detachable multi-pin electrical connections 78, screw means 62, and attachment screws 72, the marking means 44 and bracket 54 can be efficiently assembled and disassembled for maintenance.

Figure 5:
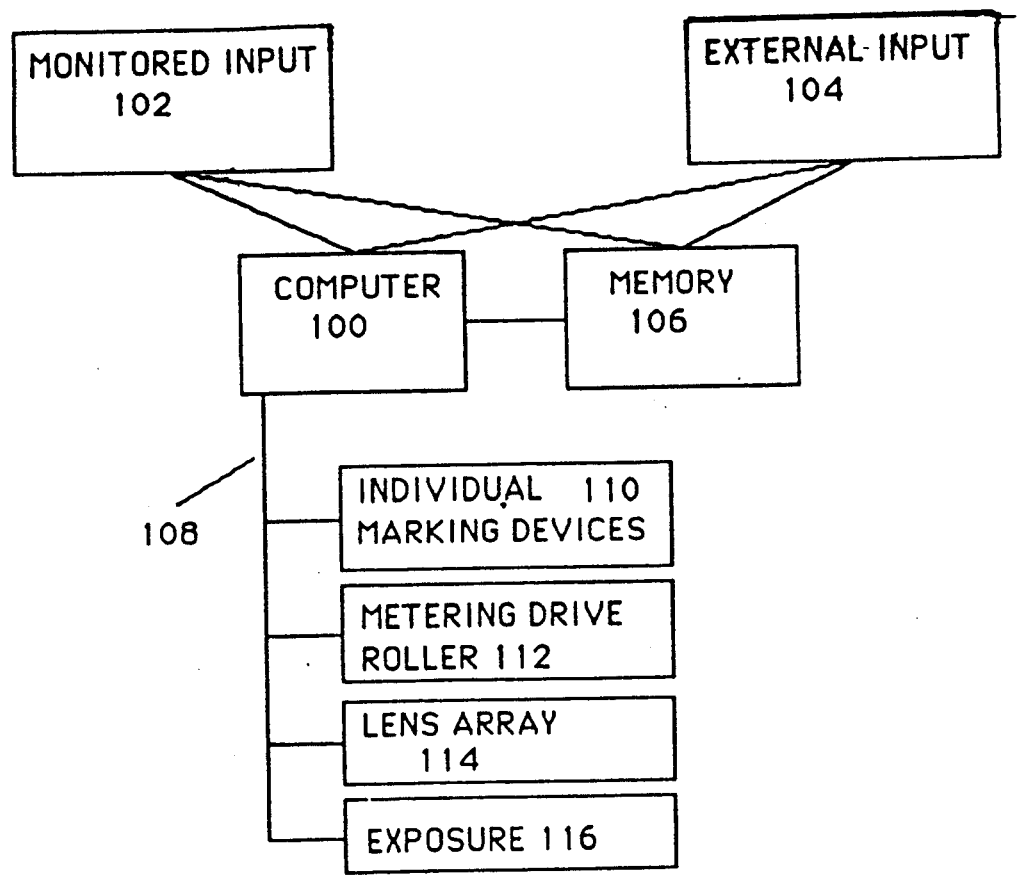
FIG. 5 is a block diagram of the control system.

With reference to FIG. 5, the arrangement allows for a computer 100 to automatically coordinate the transfer of information on the reverse side of photographic paper 16 with the exposure of photographic images. The computer 100 can receive monitored input 102 or external input 104 for utilization in this process. For example, appropriate sensors can monitor the selection of lenses, or an operator can enter information for the automatic alignment of the correct lens array 14. Information from appropriate sensors constituting monitored input 102, or use in controlling operations. Information entered by the operator constituting external input 104, or information stored in computer memory 106, can be used to control the operation processes or be identification information for placement on the reverse side of photographic paper 16. The computer 100 then can send appropriate instructions to the various pieces of processing equipment over a computer network 108, using commercially available technology. The computer can be programmed to automatically coordinate each individual marking device 110; movement of the metering drive roller 112, lens arrays 114 and exposures 116.

As disclosed, many alternative embodiments may be utilized without departing from the present invention as disclosed herein.

I claim:
1. In a photographic printing device for printing information on a substantially continuous roll of photographic paper having a photographic paper guide system, including a plurality of rollers necessary to transport the photographic paper in said device, and an exposure platen configured to retain the photographic paper in a single plane proximate the exposure area wherein at least one photographic print may be exposed on the front side of said photographic paper, an improved apparatus for printing information on the reverse side of said paper, wherein the improvement comprises:
 a marking device; and
 attachment means configured to fasten said marking device to the upper surface of the exposure platen, whereby said marking device utilizes a portion of one of said plurality of rollers necessary to transport the photographic paper as a platen for printing information on said reverse side of said paper.

2. The apparatus of claim 1, wherein said attachment means removably fastens said marking device to the exterior of said exposure platen.

3. The apparatus of claim 1, wherein said one of said plurality of rollers further comprises a metering drive roller.

4. The apparatus of claim 1, further comprising:
 at least one additional marking device disposed on said attachment means, whereby said marking device and said at least one additional marking device are disposed to print in separate fixed locations on said reverse side of said paper.

5. The apparatus of claim 1, further comprising:
 at least one additional marking device; and
 at least one additional attachment means configured to fasten said at least one additional marking device to said exposure platen whereby said at least one additional marking device can utilize at least one additional portion of said one of said plurality of rollers as a platen for printing information on said reverse side of said paper, said marking device and said at least one additional marking device being disposed to print in separate fixed locations on said reverse side of said paper.

6. The apparatus of claim 1 wherein said attachment means comprises a bracket having a pair of first and second opposed ends, said first end configured to engage with said exposure platen and a second end configured to engage with said marking device.

7. An improved apparatus for printing information on a substantially continuous roll of photographic paper, the apparatus having an exposure area wherein unexposed photographic paper is retained against an exposure platen and at least one photographic print is exposed on the front side of said paper, a marking device for printing information on the reverse side of said at least one photographic print, and at least one paper roller used in transporting said continuous roll of photographic paper across said exposure platen, wherein the improvement comprises:
 attachment means connected to the marking device in a fixed position in relation to the paper roller to utilize said paper roller as a platen for printing information on the reverse side of said photographic paper.

8. The apparatus of claim 7, wherein said paper roller further comprises a metering drive roller.

9. The apparatus of claim 7, further comprising:
 at least one additional marking device attached to said attachment means, whereby said marking device and said at least one additional marking device are disposed to print in separate fixed locations on said reverse side of said paper.

10. The apparatus of claim 7, wherein said paper roller further comprises a groove circumferentially disposed about said paper roller, corresponding in size to said marking device and located to engage said marking device in printing information on the reverse side of said photographic paper.

11. An improved apparatus for printing information on a substantially continuous roll of photographic paper, having an exposure area wherein unexposed photographic paper is retained against an exposure platen and at least one photographic print is exposed on the front side of said paper, wherein the improvement comprises:
 means for disposing multiple marking devices in fixed locations to print on specific locations on the reverse side of said photographic paper corresponding to multiple photographic prints.

12. The apparatus of claim 11, wherein said means for disposing multiple marking devices comprises a bracket configure proximate one end to be secured to the exterior of said exposure platen, and configured proximate the other end to secure said multiple marking devices thereto.

13. An apparatus for printing information on a substantially continuous roll of photographic paper in a photographic printer, comprising:
   a film exposure system having an exposure platen, and a vacuum device adapted to retain said photographic paper flat against said exposure platen, and further defining an area wherein at least one photographic print is exposed on said photographic paper;
   a series of rollers for transportation of said photographic paper across said vacuum exposure platen, including at least one metering drive roller and at least one take-up roller, said at least one metering drive roller having at least one circumferential groove;
   a bracket secured to said vacuum exposure platen; and
   at least one thermal marking device secure to said bracket and disposed proximate said at least one metering drive roller, having at least one print head corresponding to said circumferential groove, whereby said photographic paper passes between said at least one thermal marking device and said at least one metering drive roller and said thermal marking device prints information in specific sections on the reverse side of said photographic paper corresponding to said at least one photographic print.

14. In an apparatus for printing information on a substantially continuous roll of photographic paper having an exposure area wherein unexposed photographic paper is retained against an exposure platen and at least one photographic print is exposed on the front side of said paper, and at least one paper roller for use in transporting said continuous roll of photographic paper across said exposure platen, wherein the improvement comprises:
   a marking device for printing information on the reverse side of said at least one photographic print; and
   attachment means configured to position the marking device so that the paper roller is utilized both to transport the photographic paper and to act as a platen for the marking device.

15. The apparatus of claim 14, wherein said attachment means removably fastens said marking device to said exposure platen.

16. The apparatus of claim 14, wherein said paper roller further comprises a metering drive roller.

17. The apparatus of claim 14, further comprising:
   at least one additional marking device attached to said attachment means, whereby said marking device and said at least one additional marking device are disposed to print in separate fixed locations on said reverse side of said paper.

* * * * *